(12) United States Patent
Arns et al.

(10) Patent No.: US 6,449,066 B1
(45) Date of Patent: Sep. 10, 2002

(54) POLARIZATION INSENSITIVE, HIGH DISPERSION OPTICAL ELEMENT

(75) Inventors: James A. Arns, Saline; Willis S. Colburn, Ann Arbor, both of MI (US)

(73) Assignee: Kaiser Optical Systems, Inc., Ann Arbor, MI (US)

( * ) Notice: Subject to any disclaimer, the term of this patent is extended or adjusted under 35 U.S.C. 154(b) by 0 days.

(21) Appl. No.: 09/560,595

(22) Filed: Apr. 28, 2000

Related U.S. Application Data (60) Provisional application No. 60/131,556, filed on Apr. 29, 1999.

(51) Int. Cl.[7] .................................................. G02B 5/32
(52) U.S. Cl. ........................ 359/15; 359/34; 359/130; 359/566; 385/24; 385/37; 385/36
(58) Field of Search .............................. 385/36, 37, 24; 359/15, 34, 130, 566

(56) References Cited

U.S. PATENT DOCUMENTS

| | | | |
|---|---|---|---|
| 4,111,524 A | 9/1978 | Tomlinson, III | 350/96.19 |
| 4,198,117 A | 4/1980 | Kobayashi | 350/96.19 |
| 4,387,955 A | 6/1983 | Ludman et al. | 350/96.19 |
| 4,741,588 A | 5/1988 | Nicia et al. | 350/96.19 |
| 4,926,412 A | 5/1990 | Jannson et al. | 370/3 |
| 5,026,131 A | 6/1991 | Jannson et al. | 350/3.7 |
| 5,363,220 A * | 11/1994 | Kuwayama | 359/566 |
| 5,886,785 A | 3/1999 | Lefevre et al. | 356/328 |
| 5,966,483 A | 10/1999 | Chowdhury | 385/37 |
| 5,970,190 A | 10/1999 | Fu et al. | 385/37 |
| 6,018,603 A | 1/2000 | Lundgren et al. | 385/33 |
| 6,275,630 B1 * | 8/2001 | Yang | 385/37 |
| 6,343,170 B1 * | 1/2002 | Sela | 385/37 |

FOREIGN PATENT DOCUMENTS

WO     WO9321548    * 10/1993

OTHER PUBLICATIONS

B. Moslehi et al., "Fiber–optic wavelength–division multiplexing and demultiplexing using volume holographic gratings", Optics letters, 14(19), pp. 1088–1090, 1989.*

* cited by examiner

*Primary Examiner*—Cassandra Spyrou
*Assistant Examiner*—Leo Boutsikaris
(74) *Attorney, Agent, or Firm*—Gifford, Krass, Groh, Sprinkle, Anderson & Citkowski, PC (57) ABSTRACT

A volume-phase optical grating, preferably supported between substrates and prisms, uses large-angle input and output light beams to provide a very high degree of dispersion and improved separation of closely spaced wavelength channels. The average refractive index of the grating medium is also less than that of the supporting substrates and prisms, thereby providing improved uniformity and reduced sensitivity to the state of light polarization. The device therefore finds utility as a wavelength multiplexer, demultiplexer or optical spectrum analyzer in fields such as optical communications and optical signal processing. The grating itself may be constructed by conventional interferometric or holographic techniques, and may be a reflection or transmission device. In a system configuration, optical fibers may be used to carry the multiplexed or demultiplexed optical signals. Optoelectric detectors may also be used to detect different wavelengths and convert the optical signals into electrical counterparts. Alternatively, electrical signals may be converted to optical signals of differing wavelength, and these may be multiplexed using one or more of the inventive devices. Of course, optical fibers, optoelectric detectors, and emitters may be used in various combinations along with the inventive optical device depending upon the application.

21 Claims, 9 Drawing Sheets

POLARIZATION INSENSITIVE, HIGH DISPERSION OPTICAL ELEMENT

REFERENCE TO RELATED APPLICATION

This application claims priority of U.S. provisional application Ser. No. 60/131,556, filed Apr. 29, 1999, the entire contents of which are incorporated herein by reference.

FIELD OF THE INVENTION

This invention relates generally to the field of optical communications and in particular to dispersive optical devices for use in wavelength division multiplexing, in optical spectrum analysis, and in optical signal processing.

BACKGROUND OF THE INVENTION

In optical communications systems, a plurality of data channels may be transmitted simultaneously over an optical fiber wherein each data channel is characterized by a separate wavelength, or frequency. At the transmission end of the fiber, a set of diode lasers, each operating at a separate wavelength, establishes a corresponding set of data channels that are subsequently combined into a common optical path by means of wavelength division multiplexing (WDM). In WDM systems, a multiplexer is operative to receive a plurality of data channels each having a separate wavelength and to combine and transmit the data channels to a single optical fiber. At the receiving end of the fiber, a multiplexer can be used in reverse to demultiplex, or separate, the data channels according to their respective wavelengths, so that the data corresponding to each wavelength channel can be guided to its own detector or optical fiber.

WDM devices have been developed using a broad variety of technologies, including diffraction gratings, interference filters, Mach-Zehnder interferometers, Fabry-Perot etalons, birefringent elements, and prism configurations. Diffraction gratings can disperse incident light with high resolution, so that in the grating output the diffracted angle is a function of wavelength. When a beam that comprises a plurality of wavelengths is incident to a diffraction grating, the beam is diffracted into sub-beams that can be focused by a lens onto a set or an array of detectors that receive sub-beams having different wavelengths.

Diffraction gratings are widely used to disperse light into its spectral components for measurement of the spectral content of an optical beam or signal. In many cases it is desirable or necessary that the grating provide a maximum amount of dispersion; this can be accomplished by using a grating that has a high groove density.

In certain applications, it is desirable that the grating diffract incident light with the same efficiency regardless of the polarization state of the incident light. However, it is well known that the diffraction efficiency of gratings in general is not constant for different polarization states of the incident light. Typically gratings are analyzed in terms of the diffraction efficiency of light that is polarized perpendicular to the plane of incidence (s-polarization) and of light that is polarized parallel to the plane of incidence (p-polarization). A light beam of an undefined polarization state may be analyzed in terms of the s- and p-polarization components of the beam. In particular, reflective surface-relief gratings, which are the type of gratings in widest use, exhibit a significant difference in the efficiency with which they diffract the different polarizations.

SUMMARY OF THE INVENTION

This invention resides in an optical element capable of separating an optical signal made up of multiple wavelengths into separate optical signals, each constituting a single wavelength channel. Such a device can therefore serve as a wavelength demultiplexer or optical spectrum analyzer in fields such as optical communications and optical signal processing. In addition, the device can function in a reverse sense, as a wavelength multiplexer, for example, to combine a plurality of optical signals each of a different wavelength, into a single optical signal.

The optical element preferably comprises a volume phase grating supported between substrates and prisms. The prisms facilitate the use of input and output beams that make large angles with respect to the normal to the plane of the grating. In a configuration with large input and output angles, the grating provides a very high degree of dispersion, which leads to improved separation of closely spaced wavelength channels. In addition, the average refractive index of the grating medium is less than that of the supporting substrates and prisms, in which case the optical element provides improved uniformity and reduced sensitivity to the state of polarization of the input beam over a range of wavelengths.

The grating may be constructed by conventional interferometric or holographic techniques, and may be a reflection or transmission device, though the latter is used in the preferred embodiment. In a system configuration, optical fibers may be used to carry the multiplexed or demultiplexed optical signals. Optoelectric detectors may also be used to detect different wavelengths and convert the optical signals into electrical counterparts. Alternatively, electrical signals may be converted to optical signals of differing wavelength, and these may be multiplexed using one or more of the inventive devices. Of course, optical fibers, optoelectric detectors, and emitters may be used in various combinations along with the inventive optical device depending upon the application.

DETAILED DESCRIPTION OF THE INVENTION

Figure 1A:
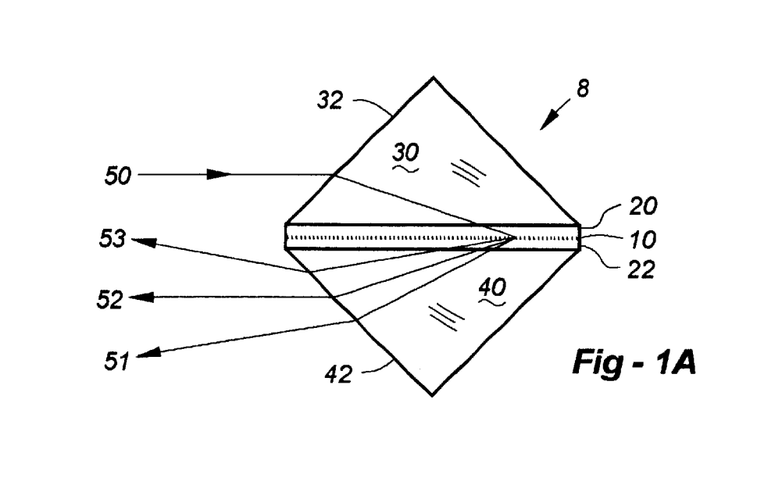
FIGS. 1a and 1b illustrate the configuration of an optical element wherein a volume phase transmission grating provides high dispersion and low polarization sensitivity.

Making reference to the drawings, FIG. 1a is a sketch of an optical element 8 according to a preferred embodiment of the invention. A volume phase transmission grating 10 is disposed between the inner surfaces of supporting substrates 20 and 22. Prisms 30 and 40 are disposed on the outer surfaces of the supporting substrates. An incident beam 50, which contains a plurality of wavelengths, is refracted at surface 32 of prism 30, and directed toward substrate 20. Because prism 30 and substrate 20 typically have similar or the same refractive index, there is little or no additional refraction at the interface between the prism and the substrate. The input beam continues on its path until it reaches grating 10, which is a dispersive diffraction grating. The grating diffracts and disperses input beam 50 into its separate wavelength components, forming output beams indicated schematically as beams 51, 52, and 53. These are similarly transmitted through substrate 22 and prism 40, where again there is little or no refraction at the substrate-prism interface because of similar or identical refractive indexes. At the surface 42 of prism 40, the output beams are refracted into the surrounding medium, which is typically air.

Although FIG. 1a shows input beam 50 and output beam 52 approximately parallel to each other, but propagating in opposite directions, it will be appreciated that the designer is free to choose other angles for input and output beams by modifying the prism configuration, the wavelength range, and the grating period.

Three output beams only are shown for clarity, each characterized by a separate wavelength. In many applications, however, there will be considerably more separate, typically contiguous, wavelengths and corresponding output beams. In FIG. 1a, output beam 51 is characterized by wavelength $\lambda 1$, output beam 52 is characterized by wavelength $\lambda 2$, and output beam 53 is characterized by wavelength $\lambda 3$, where $\lambda 1 < \lambda 2 < \lambda 3$. Diffraction gratings diffract light of shorter wavelengths through smaller angles and light of longer wavelengths through larger angles; accordingly FIG. 1a shows output beams 51–53 having output angles that depend on their respective wavelengths.

Figure 2A:
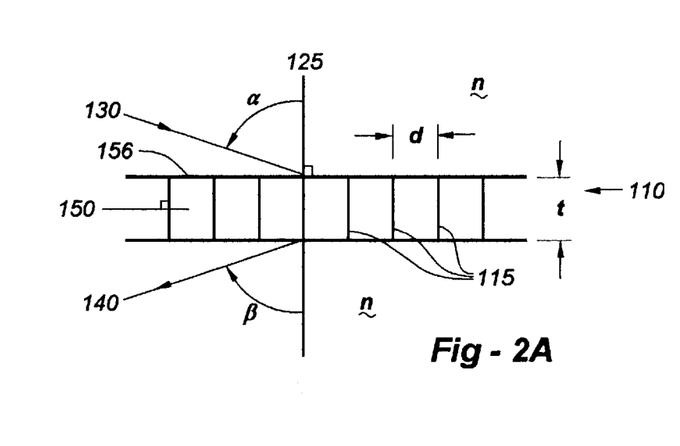
FIGS. 2a and 2b shows schematically the detailed configuration respectively of a volume phase transmission grating and a volume phase reflection grating.

FIG. 2a illustrates a volume phase transmission grating in cross-section with a beam configuration that is representative for the present invention. Diffraction by the volume phase grating is governed by the well-known grating equation, which is given by $$\sin\alpha + \sin\beta = \frac{m\lambda}{nd}, \quad (1)$$

where
- $\alpha$ = angle of the incident beam relative to the surface normal,
- $\beta$ = angle of the output beam relative to the surface normal,
- $m = 0, \pm 1, \pm 2, \ldots$ is the diffraction order,
- $\lambda$ = wavelength of the incident light,
- $n$ = the refractive index of the surrounding medium, and
- $d$ = the fringe spacing, or period, of the grating.

The fringe spacing d in a volume phase grating corresponds directly to the groove spacing in a classical ruled grating. Volume phase gratings may have slanted fringe planes, in which case d, in equation 1, is the period measured at the grating surface 156, which is greater than the minimum spacing between fringes in the volume of the grating. The grating 110 has a thickness t, fringe planes 115, and is supported by substrates with refractive index n located above and below the grating medium in FIG. 1a. An incident beam 130 makes an angle $\alpha$ with the surface normal 125 and is diffracted by the grating into diffracted beam 140 that makes an angle $\beta$ with the surface normal. The plane formed by the incident beam and the surface normal 125 is referred to as the plane of incidence. In the preferred embodiment, the incident and diffracted beams and the surface normal 150 to the fringe planes 115 lie in the plane of incidence. In other embodiments, the normal 150 to the fringe planes need not lie in the plane of incidence, so that the fringes may be tilted about either the grating surface normal 125 or an axis perpendicular to the plane of incidence, or both. Within the substrates and prisms of the preferred embodiment, $\alpha$ is about 71 degrees, m=+1, n=1.501, d=0.54 $\mu$m, $\lambda$ has a range from 1.525 to 1.565 $\mu$m, and $\beta$ has a corresponding range from about 70 to 75 degrees. Because the dispersion of a diffraction grating is inversely proportional to both the fringe period and the cosine of the diffraction angle, the high internal incidence and diffraction angles and small grating period correspond to a very high degree of dispersion by the grating. Such a grating has a high spatial frequency, where the spatial frequency is the inverse of the grating period.

It is well known that the efficiency with which volume phase gratings diffract light depends on Bragg effects, which enhance the diffraction efficiency at preferred wavelengths and angles as a result of constructive interference effects. The diffraction efficiency of volume phase gratings is usually a maximum when the Bragg condition is satisfied, which is given by $$2n\Lambda \sin\alpha = b\lambda, \quad (2)$$

where $b = 1, 2, 3, \ldots$ is the Bragg order, $\Lambda$ is the minimum distance between fringes within the volume of the grating, and the other terms are as defined above for equation 1. For fringes that are not tilted, the fringe normal 150 is parallel to the grating plane, and $\Lambda$ is the same as d. In the nominal Bragg design for the preferred embodiment, the surface normal 150 to the fringe planes lies in the plane of incidence, with $b=1$, $\alpha=\beta=70.8$ degrees, $\Lambda=d=0.54$ $\mu$m, and $\Lambda=1.550$ $\mu$m.

The fringe structure in volume phase gratings is manifest as an approximately sinusoidal profile in refractive index, which profile has amplitude n1, referred to as the index modulation, about an average refractive index $n_g$. The diffraction efficiency of volume phase gratings can be modeled by the use of Rigorous Coupled-Wave Analysis (RCWA), which is described in various publications, such as "Rigorous coupled-wave analysis of planar-grating diffraction", by M. G. Moharam and T. K. Gaylord in the Journal of the Optical Society of America, vol. 71, pp 811–818, July 1981. In the configuration shown in FIG. 1a, the diffraction efficiency will depend on various grating parameters, including those described with respect to equations 1 and 2 and FIGS. 1a and 2a.

The efficiency of diffraction gratings is known to depend also on the state of polarization of the input beam. The input beam can be regarded to have a polarization component that is perpendicular to the plane of incidence and a component that is parallel to the plane of incidence. These are designated as s-polarization and p-polarization components respectively. For a volume phase transmission grating, as shown in FIGS. 1a and 2a, it is possible to find a value of index modulation at which the s- and p-polarization components are diffracted with the same efficiency at a given wavelength. At other wavelengths, however, there is a substantial difference in the diffraction efficiencies of the two polarization components.

Figure 3:
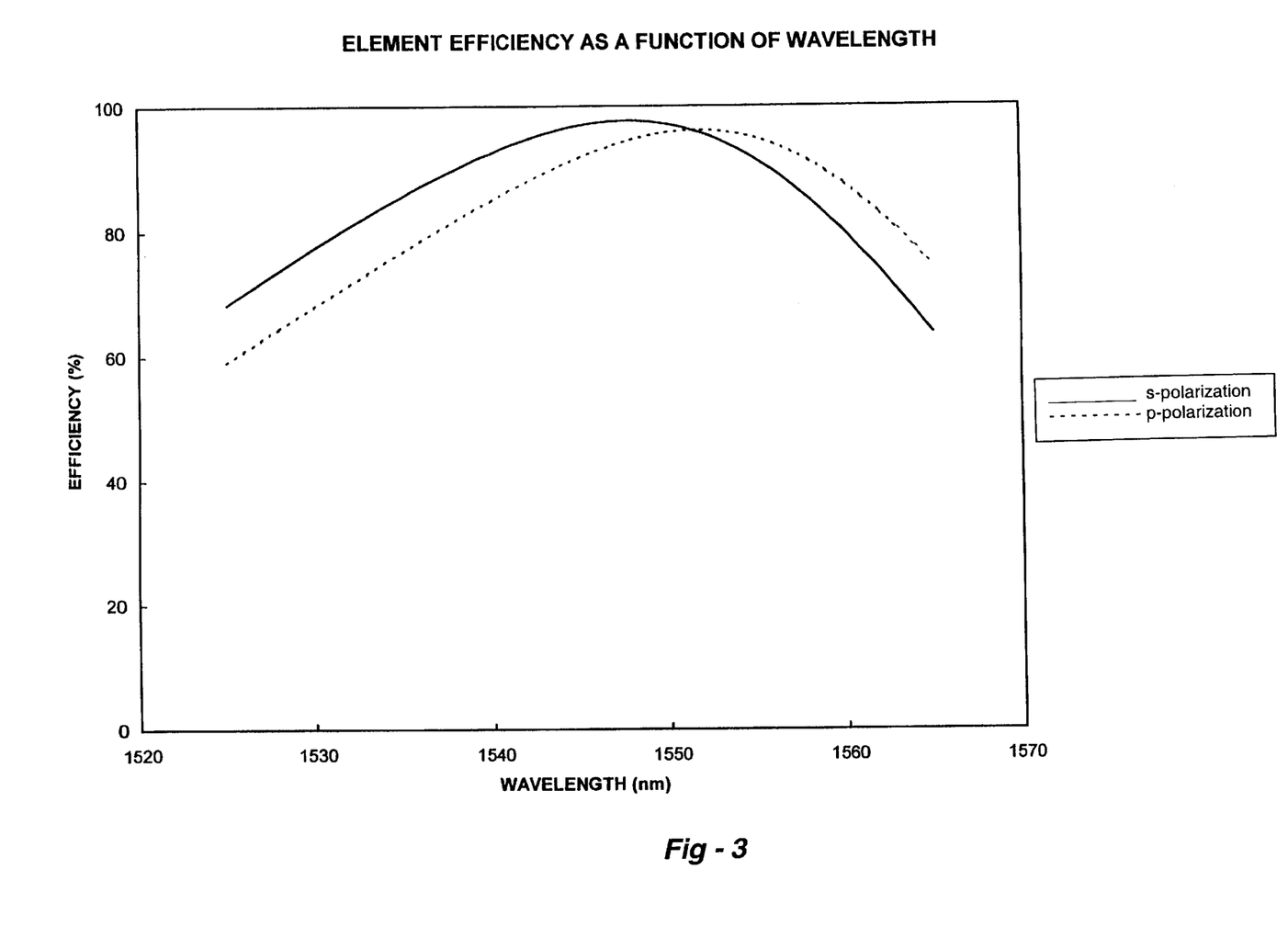
FIG. 3 shows theoretical efficiency curves of s- and p-polarized input beams wherein the polarization sensitivity is high and the efficiency uniformity is poor over a range of wavelengths.

FIG. 3 shows a plot of the diffraction efficiencies of the s- and p-polarization components as a function of wavelength over the 1.525 to 1.565 $\mu$m range of the preferred embodiment; the efficiencies shown are those predicted by RCWA theory. As is evident from the curves in FIG. 3 there is a substantial difference in efficiency for the two polarization components except in the vicinity of $\lambda$=1.552 $\mu$m, and a substantial efficiency variation for each polarization over the wavelength range. The extent of efficiency nonuniformity and polarization shown in FIG. 3 is undesirable for certain applications.

Figure 4:
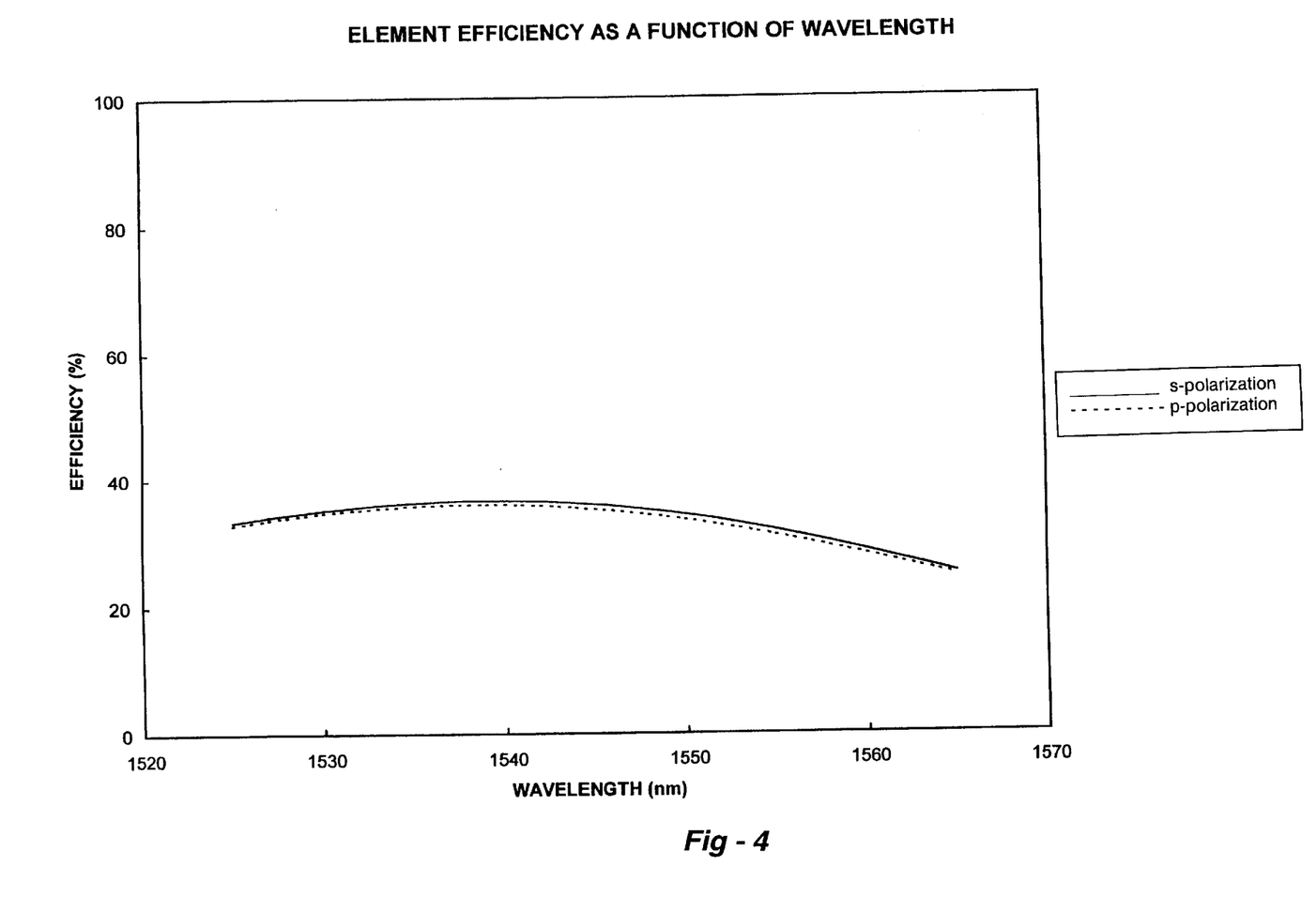
FIG. 4 shows theoretical efficiency curves of s- and p-polarized input beams in accordance with the present invention wherein the polarization sensitivity is low and the efficiency uniformity is good over a range of wavelengths.

In many configurations of volume phase gratings, small differences between the refractive index of the supporting substrates and the average refractive index $n_g$ of the grating medium have little or no effect on the performance of the grating. However, the inventors found that when the incident angles are relatively large, the diffraction efficiency of the grating will be relatively uniform and free of polarization sensitivity if the average index of the grating medium is somewhat lower than that of the supporting substrates. An example is shown in FIG. 4, which is based on the same grating parameters as used for FIG. 3, except for changes in the average refractive index $n_g$ of the grating medium, the refractive index modulation n1, and the grating thickness t. For the curves shown in FIG. 3, $n_g$=1.52, n1=0.067, and t=4.0 $\mu$m whereas for the curves shown in FIG. 4, $n_g$=1.45, n1=0.064, and t=2.1 $\mu$m. For the analyses represented by both FIGS. 3 and 4, the refractive index of the supporting substrates was 1.52.

Figure 5:
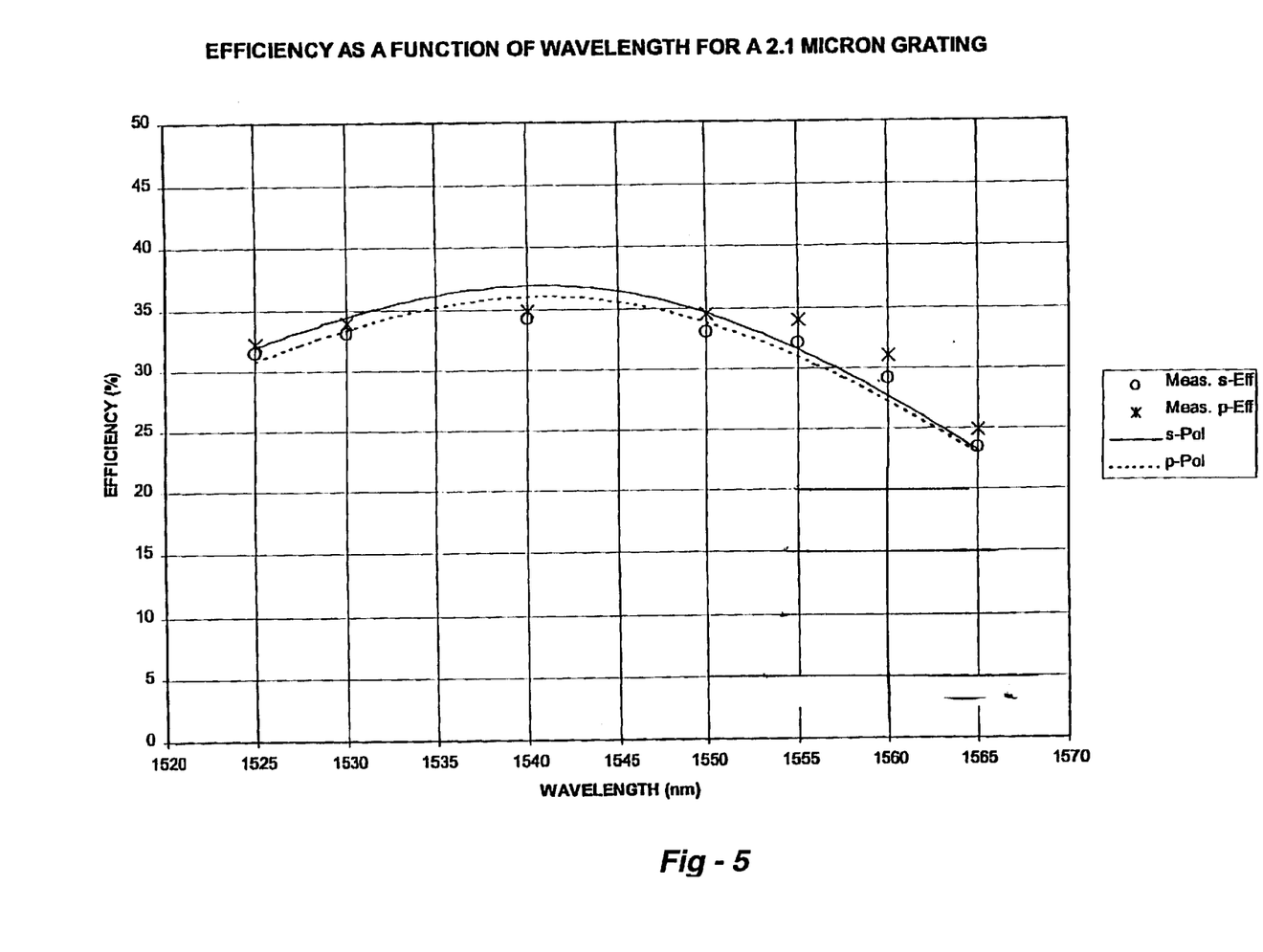
FIG. 5 shows and measured efficiency data from a manufactured optical element according to the present invention with theoretical curves that are a close fit to the measured data points.

FIG. 5 shows efficiency data measured from a manufactured optical element configured as shown in FIG. 1a. An approximate fit to the measurements was made with the RCWA model and is shown by the curves in FIG. 5. The modeling parameters were similar to those used for the curves in FIG. 4 except that the refractive index modulation n1 was reduced to 0.054.

Figure 1B:
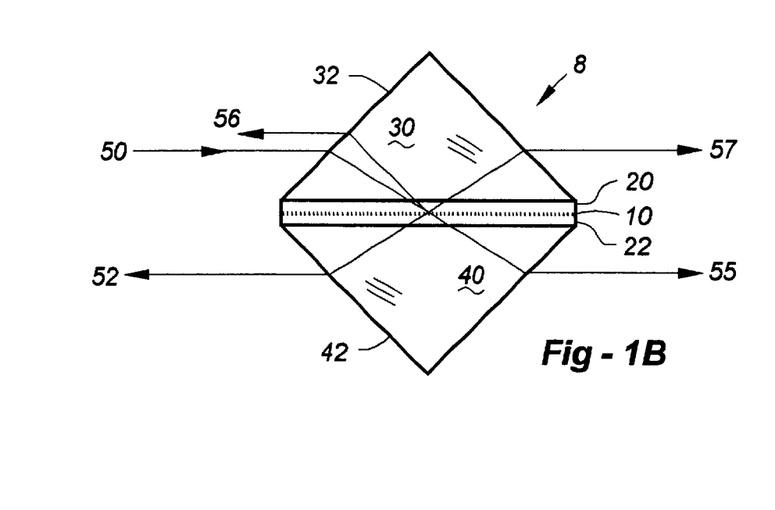

Other diffraction orders may exist with significant efficiencies. Because of the high spatial frequency of the grating, only four diffraction orders propagate; other orders are evanescent and do not propagate. The propagating orders are the zero and first orders, in both transmission and reflection. FIG. 1b shows the optical element with the four diffraction orders as they would appear for a single wavelength input. Output beam 52 is the first order in transmission and output beam 55 is the zero order in transmission. Output beam 56 is the first order diffraction in reflection and output beam 57 is the zero order in reflection. The first order in reflection, output beam 56, will be dispersed to the same extent as the first order in transmission, and consequently the two first order beams carry the same information. Therefore, in alternative embodiments either or both first order beams may be used in an application. With nominal alignment, output beam 56 may be coincident with the input beam 50. The output beam can be separated from the path of the input beam by providing a small tilt to the optical element or by the use of a beamsplitter in the input beam path.

The volume phase grating can be constructed by conventional interferometric, or holographic, techniques. The gelatin medium in the preferred embodiment is dichromated gelatin, although other volume phase materials such as photopolymers may be used instead. Processed dichromated gelatin gratings or holograms are known to have an average refractive that is lower than that of glass types commonly used as substrates and prisms. The refractive index of dichromated gelatin elements is discussed in detail in "Comparison of methods for determining the bias index of a dichromated gelatin hologram", by G. Campbell, T. J. Kim, and R. K. Kostuk in Applied Optics, vol. 34, pp. 2548–2555.

Figure 6A:
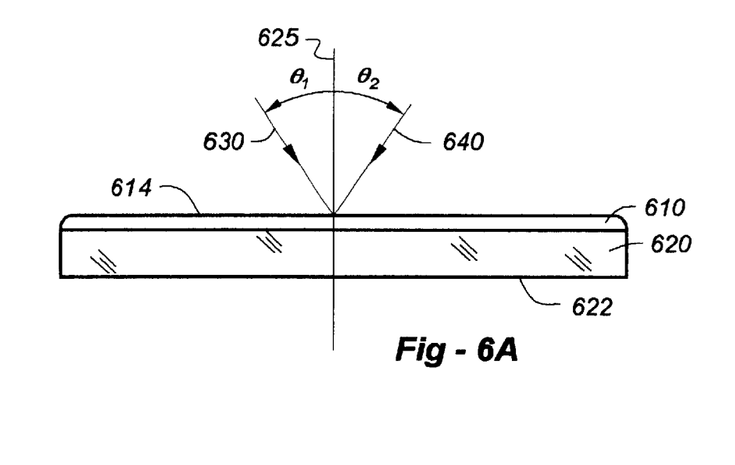
FIGS. 6a and 6b illustrate respectively the preferred construction configuration used to expose a volume phase transmission grating and a construction configuration used to expose a volume phase reflection grating.

FIG. 6a shows a representative construction configuration for exposing a transmission grating. Grating medium 610 is coated on supporting substrate 620 and illuminated with mutually coherent construction beams 630 and 640, which make angles θ1 and θ2, respectively, with the surface normal 625. In the preferred embodiment the construction beams make equal and opposite angles with the surface normal, such that θ1=θ2, and the beams are collimated. The construction beams must have a wavelength within the wavelength region of spectral sensitivity of the recording material, which region of spectral sensitivity may lie outside the wavelengths in which the device is intended to be used.

During the construction phase, dichromated gelatin is sensitive to light having wavelengths from the UV through the green region of the spectrum. In the preferred embodiment, the construction wavelength is 0.488 mm, and the construction angles are about 27 degrees with respect to the surface normal 625. As is known in the holographic construction art, in the presence of a wavelength shift between construction and use, the construction angles can be found by solving equation 1 with $\alpha=\beta=\theta 1$, $\lambda$ set to the construction wavelength, d set to the grating period, and n set to 1.00 for construction beam angles in air. During construction the rear surface 622 of the supporting substrate 620 is typically coated with a temporary absorbing layer to prevent the return of significant reflections of those portions of the construction beams transmitted through the grating layer 610. Alternatively, a plate with an absorbing medium may be index-matched to surface 622 of the substrate with an index-matching material, preferably an oil of suitable refractive index.

After any processing of the gelatin medium required to develop or enhance the recorded grating, a second supporting substrate is placed in optical contact with the free surface 614 of the grating medium. Optical contact can be provided by a coupling medium that has a refractive index relatively close to that of the supporting substrates, to the average refractive index of the grating medium, or between that of the supporting substrate and grating medium. The coupling medium may be an optical adhesive or an index matching fluid, such as an oil or a solvent. In some cases it may be possible to achieve optical contact without a separate coupling medium.

Figure 7:
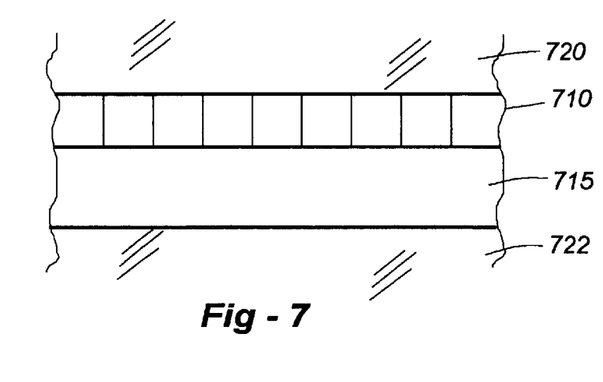
FIG. 7 is a magnified, cross sectional, schematic view of an optical element of the present invention showing the disposition of the grating medium, the coupling medium, and the supporting substrates.

FIG. 7 shows schematically a magnified cross section of the grating 710 and coupling medium 715 between supporting substrates 720 and 722. Prisms, as depicted in FIG. 1, may be subsequently attached to the supporting substrates with an optical adhesive or index matching fluid.

Figure 8A:
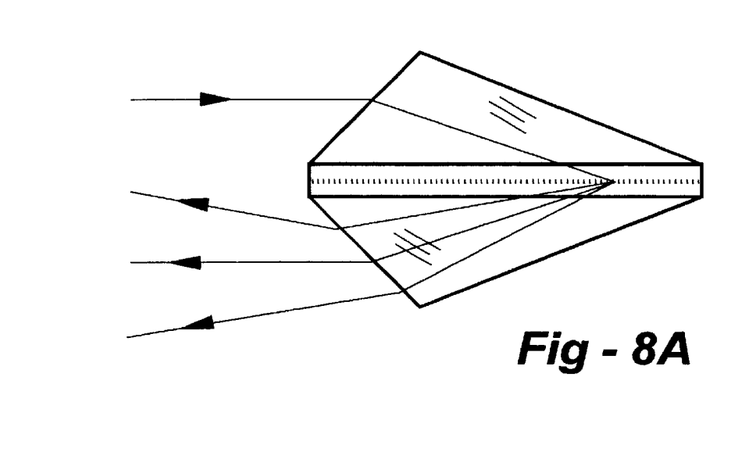
FIGS. 8a, 8b, 8c, and 8d illustrate alternative configurations of the optical element.
Figure 8B:
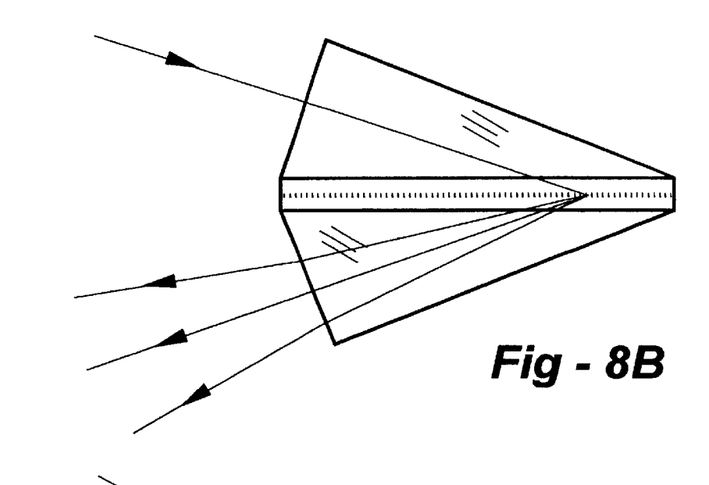
Figure 8C:
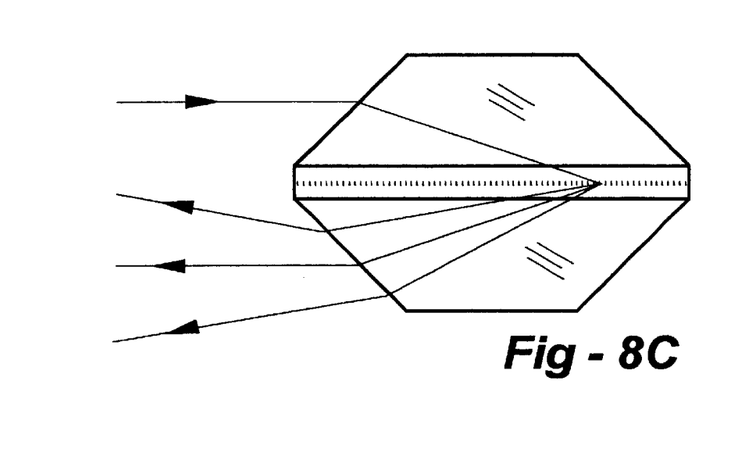
Figure 8D:
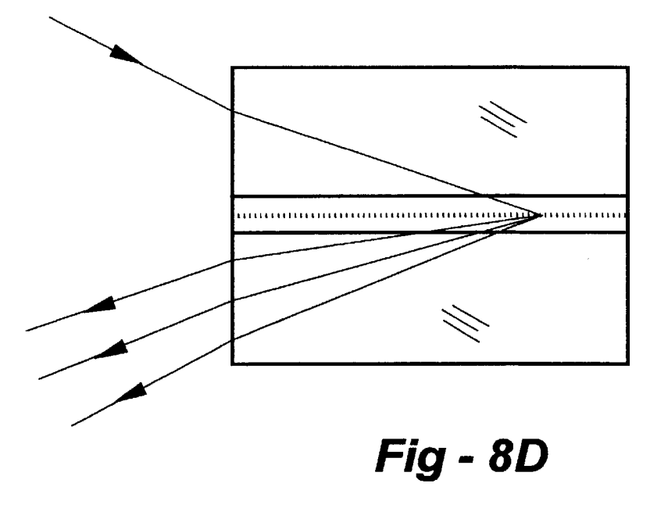

The preferred embodiment uses 45-90-45 degree prisms, with the hypotenuse of the prisms bonded to the supporting substrates. The prism is utilized to provide large incident and diffraction angles within the substrates, grating medium, and any coupling medium. Many other configurations can achieve the same objective, and may be advantageous depending on the application. FIG. 8 shows sketches of several different configurations. In FIG. 8*a,* the 45-90-45 degree prisms shown in FIG. 1 have been truncated to reduce volume and weight while still providing the volume required by the beam paths. In FIG. 8*b,* the input beam is incident along the normal to the input prism surface and the central wavelength in the output beams is normal to the output prism surface. FIG. 8*c* shows a configuration similar to that shown in FIG. 1, but which has truncated prisms and also has the grating and coupling media supported directly between the prisms, without requiring the intermediate supporting substrates. For manufacturing reasons the configuration shown in FIG. 1*a* is preferred to that of FIG. 8*c,* although the latter configuration has fewer components and surfaces. FIG. 8*d* shows a configuration in which the supporting substrates are made sufficiently thick that the input and output surfaces are at one end of the substrates.

The supporting substrates and prisms may be made of transparent optical materials such as glass or plastic. Glass is used in the preferred embodiment, in part to protect the dichromated gelatin grating from the effects of moisture.

In all cases, those surfaces that are crossed by the input and output beams must be manufactured to an appropriate optical quality for the application. Although all of the configurations are shown with flat surfaces, it may be advantageous in some applications to use nonflat, or curved, surfaces. Refraction at the input or output surfaces may increase or decrease the total amount of dispersion depending on the configuration.

The optical element of the present invention provides very high dispersion. The grating period is small and the obliquity factor of the high incidence angle of the input beam spreads the beam over many fringes. For example, an input beam that is 3 mm in diameter at an internal incidence angle of 71 degrees will cover a grating length of about 9 mm. The resolution of a diffraction grating is proportional to the number of grating lines illuminated by the input beam, which in this case exceeds 16,000 lines for the 0.54 $\mu$m grating period disclosed in the examples presented above.

Figure 9:
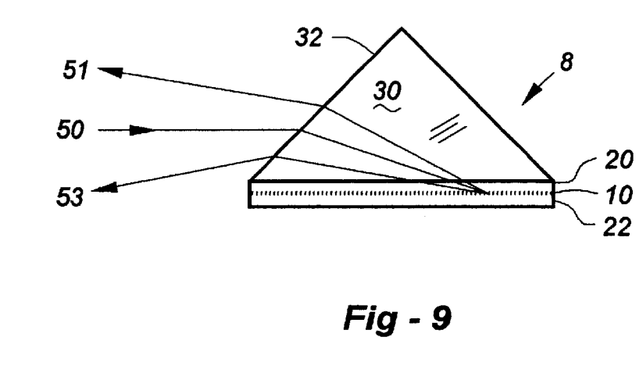
FIG. 9 illustrates the configuration of an optical element wherein a volume phase reflection grating provides high dispersion and low polarization sensitivity good over a range of wavelengths.

In an alternative embodiment, the grating of the present invention may be a volume phase reflection grating. FIG. 9 is a sketch of an optical element 8 that utilizes a reflection grating. A volume phase reflection grating 12 is disposed between the inner surfaces of supporting substrates 20 and 22. Prism 30 is disposed on the outer surface of supporting substrate 20. An incident beam 50, which contains a plurality of wavelengths, is refracted at surface 32 of prism 30, and directed toward substrate 20. Again because prism 30 and substrate 20 typically have a similar or the same refractive index, there is little or no additional refraction at the interface between the prism and the substrate. The input beam continues on its path until it reaches grating 12. The grating diffracts and disperses input beam 50 into its separate wavelength components, forming output beams indicated schematically as beams 51, and 53, which are transmitted back through substrate 20 and prism 30. At the surface 32 of prism 30, the output beams are refracted into the surrounding medium, which is typically air. Since the input and output beams may overlap, as mentioned above the beams can be separated by tilting the optical element or by providing a beamsplitter in the input-output space.

Supporting substrate 22 does not contribute to the optical function of the configuration shown in FIG. 9, but is preferably used to provide protection to what would otherwise be an exposed surface of the grating medium. In the case of dichromated gelatin gratings it is required to form a moisture-impervious barrier. Since the relevant beam paths do not cross the surfaces of substrate 22, the surfaces do not need to be of high optical quality, and further, substrate 22 is not even required to be transparent.

Figure 2B:
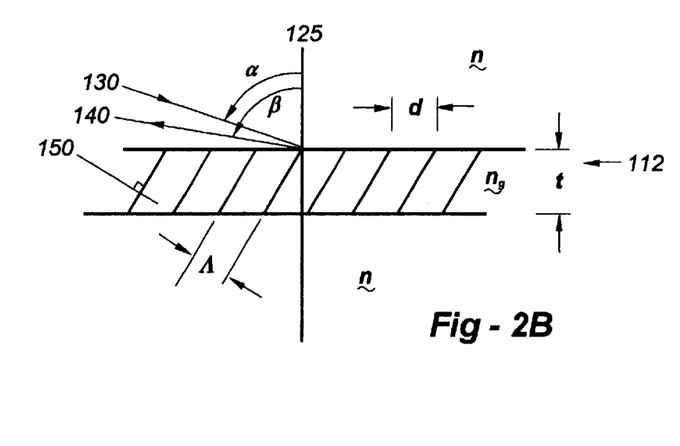

FIG. 2*b* illustrates a volume phase reflection hologram in cross section. In this case the fringes are tilted so that the normal to the fringe planes 150 is parallel to the input beam 130. The grating medium has an average refractive index $n_g$ and the supporting substrates have a refractive index n. The supporting substrates and prism may have different refractive indexes, but typically this is not the case. As mentioned above, the output beam 140 travels a path nominally along the input beam path. The minimum fringe period $\Lambda$ is set to one-half of the incident wavelength within the grating medium, or $\Lambda=\lambda/2n_g$, which will satisfy the Bragg condition. Equations 1 and 2 both apply to volume phase reflection gratings, and can be used to determine various grating parameters.

Figure 10:
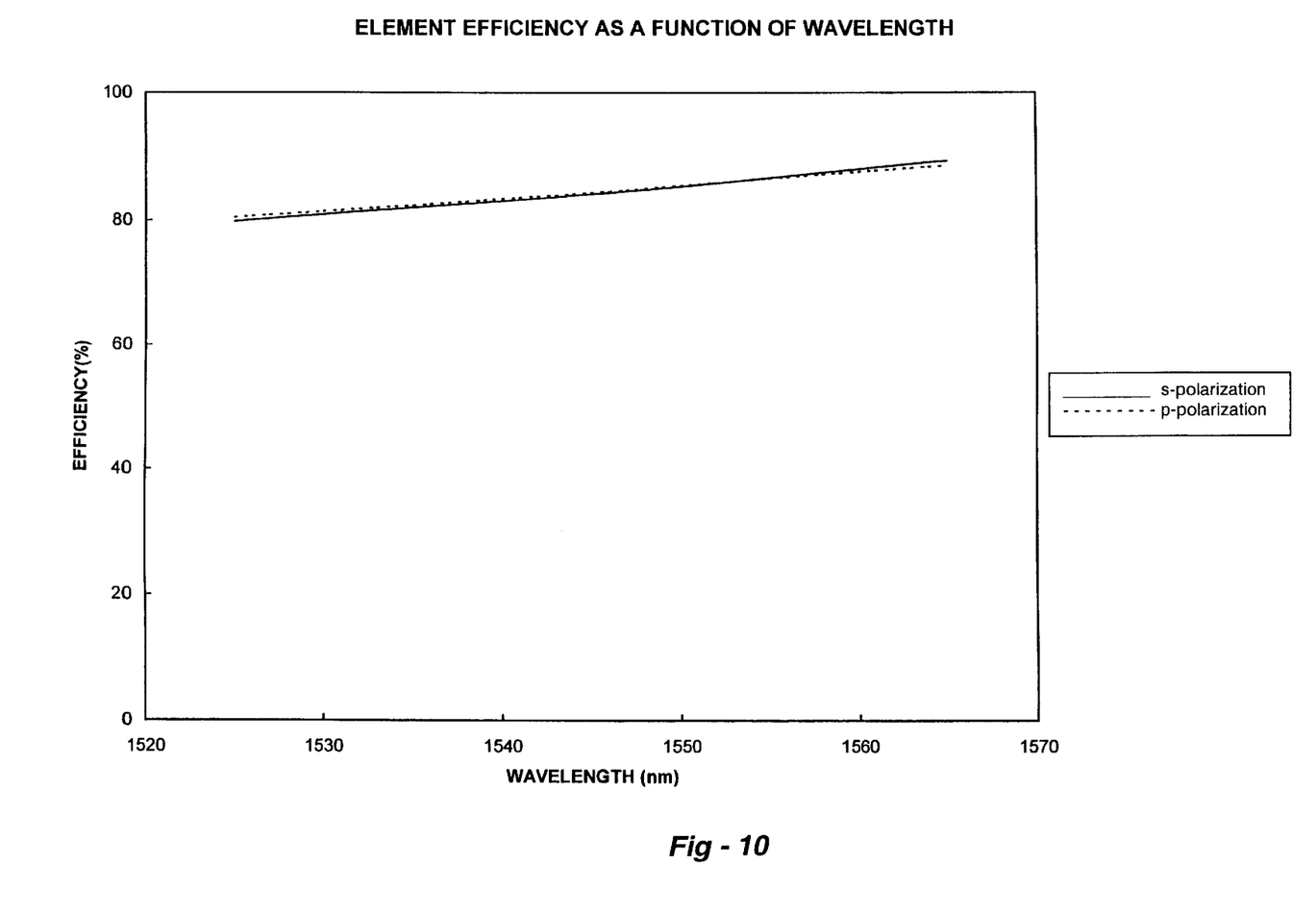
FIG. 10 shows theoretical efficiency curves of s- and p-polarized input beams where the optical element comprises a volume phase reflection grating.

An example of the embodiment of the present invention utilizing a volume phase reflection grating has $\alpha=70.8$ degrees, t=5.0 mm, n1=0.080, d=0.566 $\mu$m, $\Lambda$=0.535 $\mu$m, n=1.52, and $n_g$=1.449. FIG. 10 shows curves of the diffraction efficiencies of s- and p-polarization components as a function of wavelength over the 1.525 to 1.565 $\mu$m wavelength band; the curves were generated using RCWA theory. It is clear from the curves in FIG. 10 that this embodiment is capable of providing an output that is efficient, uniform, and insensitive to polarization throughout the wavelength band.

Figure 6B:
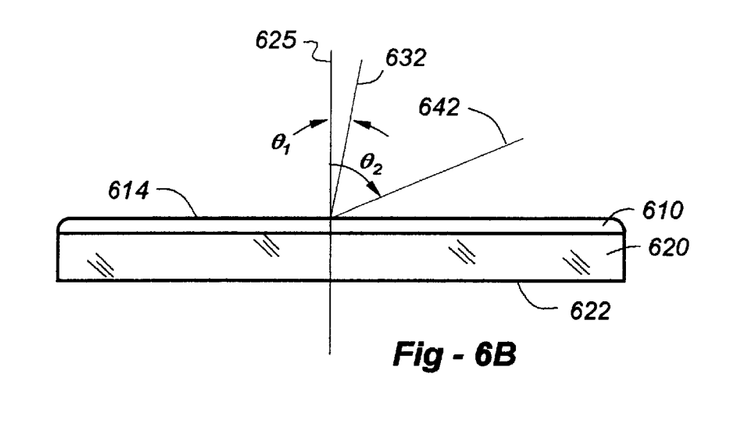

Volume phase reflection grating construction is similar to the construction discussed above for transmission gratings. FIG. 6*b* shows schematically a construction layout that is suitable for recording the exemplary reflection grating described in the preceding paragraph. The construction system must provide an interference pattern with the required minimum fringe period $\Lambda$ and the required fringe tilt. The construction angles $\theta$1 and $\theta$2 at a construction wavelength of 0.488 $\mu$m can be found by calculating the angles between the beams and the fringe planes inside the grating medium, transforming the angles to the grating coordinate system, and applying Snell's law to convert the angles within the grating medium to angles in air, which are $\theta$1 and $\theta$2 as shown in FIG. 6*b*. If the one or both construction beams within the grating medium exceed the critical angle, a prism can be used to introduce the beams into the grating medium. For the exemplary reflection grating with a construction wavelength of 0.488 mm, the angles in air between construction beams 632 and 642 and the surface normal 625 are $\theta$1=2.7 degrees and $\theta$2=65.3 degrees.

As shown in FIG. 8 for the embodiment with transmission gratings, the configuration of FIG. 9 may be similarly modified or reconfigured depending on the requirements of a particular application.

In the examples disclosed hereinabove, the invention was shown to be operative over a spectral band in the vicinity of 1.55 $\mu$m. The invention is readily capable of being applied to other wavelength bands by appropriate design of the prisms and grating. Another wavelength region of interest lies in the vicinity of 1.3 $\mu$m, and it is further possible to make an optical element in accordance with the present invention that is operative in the visible portion of the spectrum.

In some cases separate, overlapping gratings may be constructed in the same grating medium, by means of a double exposure for example, each grating being operative on a separate wavelength band. Each grating would have a separate fringe period that corresponds to the waveband associated with that grating. Because of Bragg effects, volume phase gratings diffract efficiently only over a limited band of wavelengths, and radiation having wavelengths sufficiently removed from the limited wavelength band will have undergo little or no interaction with the grating. If the separate wavebands of interest are sufficiently far apart in wavelength, signals in one band will be diffracted only by the grating constructed for that wavelength band. Furthermore any diffraction of one set of wavelengths by the grating associated with the other waveband would, in accordance with the grating equation, be diffracted in a different direction than that of the desired output beams, reducing the possibility of any significant cross talk between wavebands.

Figure 11A:
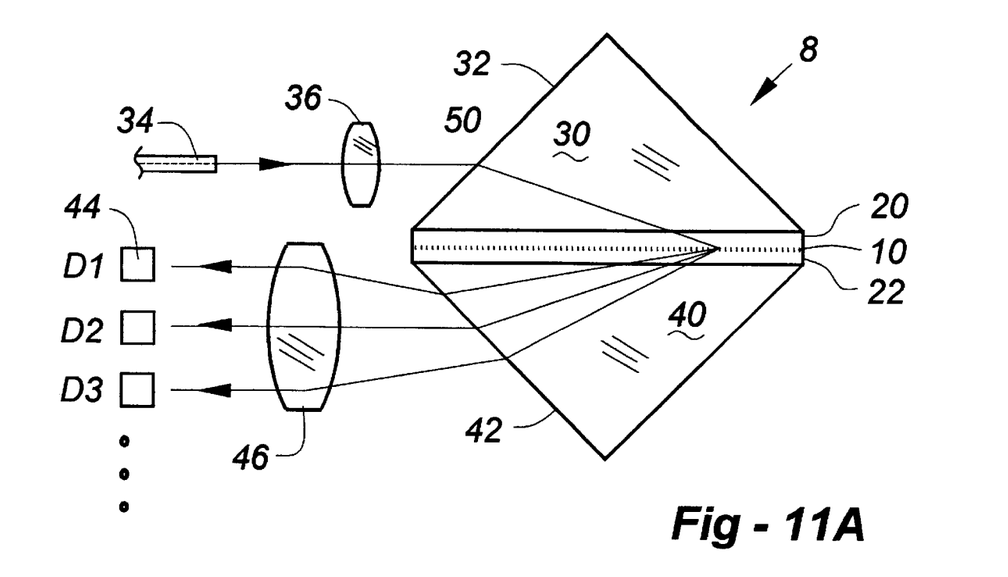
FIGS. 11a, 11b, and 11c schematically illustrate optical systems that utilize the optical element of the present invention telecommunications applications.

The optical element of the present invention is well suited to optical telecommunications applications. FIG. 11a shows the optical element 8 of the present invention combined with focusing lenses, an optical fiber, and an array of detectors in a configuration that would provide a demultiplexing function. In operation an optical signal emerges from optical fiber 34; the signal contains a plurality of wavelength channels, each wavelength channel corresponding to a single communications channel. Lens 36 collimates the optical signal, or beam, that emerges from the fiber and directs the collimated beam into prism 30 of the optical element. The focal length of lens 36 may be determined to provide a required diameter of the collimated input beam 50. At prism surface 32, beam 50 is refracted (and dispersed slightly), subsequently passing through prism 30 and substrate 20 to a volume phase grating 10, where it is dispersed into separate beams, each of which corresponds to a particular wavelength channel. The dispersed beams propagate through substrate 22 and prism 40, and are refracted at prism surface 42. A second lens 46 is provided that focuses the output beams onto detectors 44 (for clarity electronic signal lines are not shown with the detectors), which are sensitive to the wavelengths in the output beam, and which may be discrete elements or preferably may be a detector array such as a charge-coupled device (CCD). The location and spacing of detector elements 44 depends on the focal length of lens 46, the amount of dispersion provided by optical element 8, and the wavelength separation of the individual wavelength channels. Alternatively the system may be used for optical spectrum analysis if there is little or no spacing between the detector elements.

Figure 11B:
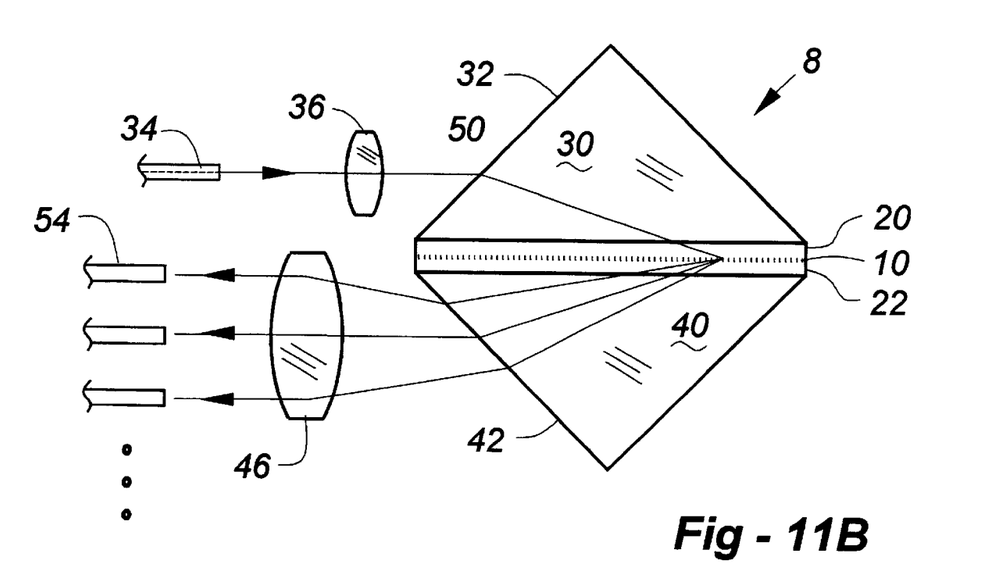
Figure 12:
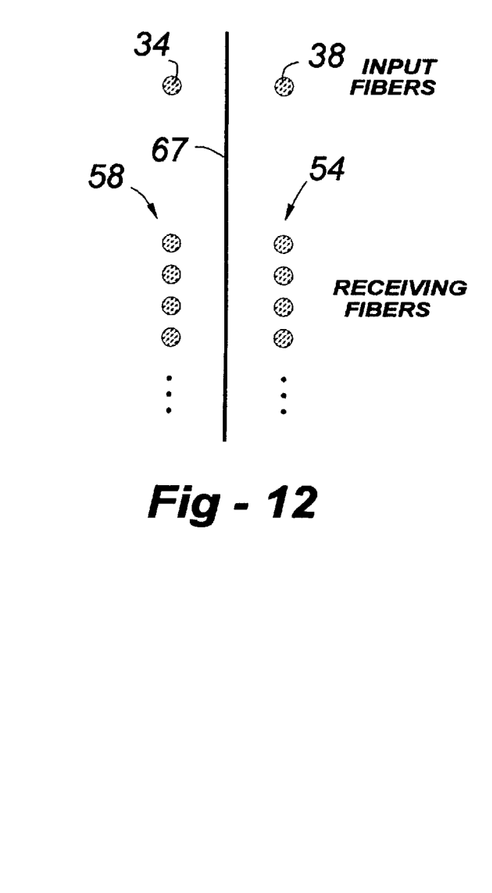
FIG 12 is a view of the optical fibers in a two-band telecommunications application as viewed from the optical element.

In an alternative configuration, the detectors 44 may be replaced by a set of optical fibers 54, as indicated schematically in FIG. 11b. Each optical fiber receives a signal corresponding to one of the wavelength channels, and may transmit it to another location for detection and further processing. The system may be simultaneously operative on two wavelength bands if two overlapping gratings are exposed in which the two gratings have different fringe periods that are designed for the two respective wavelength bands. FIG. 12 shows a configuration of fibers as they would be viewed from the optical element. Two sets of input and output fibers are provided, each individual set being associated with a particular wavelength band. The two sets of fibers could be removed by a small amount from the grating plane 67 defined by the normal to the grating and the normal to the grating fringes. An input fiber 34 emits light with wavelengths in the first wavelength band, which, because of the offset of the input fiber, is received by the set of output, or receiving fibers 54. Similarly the input fiber 38 emits light with wavelengths in the second wavelength band, and the corresponding output beams are received by the set of output fibers 58. Because the input fibers are displaced from the grating plane, each input beam has a tilt relative to the grating plane. The output beams will also be tilted, as each input beam and its corresponding output beams lie in a separate plane that is tilted with respect to the grating plane. Therefore each input fiber and its respective set of output fibers lie on opposite sides of the grating plane as indicated in FIG. 12.

By tapping a small amount of signal from various points along an optical fiber that is carrying a multiplexed signal, the optical systems shown in FIGS. 11a and 11b can also be used for the purpose of monitoring the condition of the transmission of the multiplexed signal as it propagates along the optical fiber. The signals corresponding to each wavelength channel would be monitored electronically to detect power fluctuations or losses on each channel during operation of a communications system.

Figure 11C:
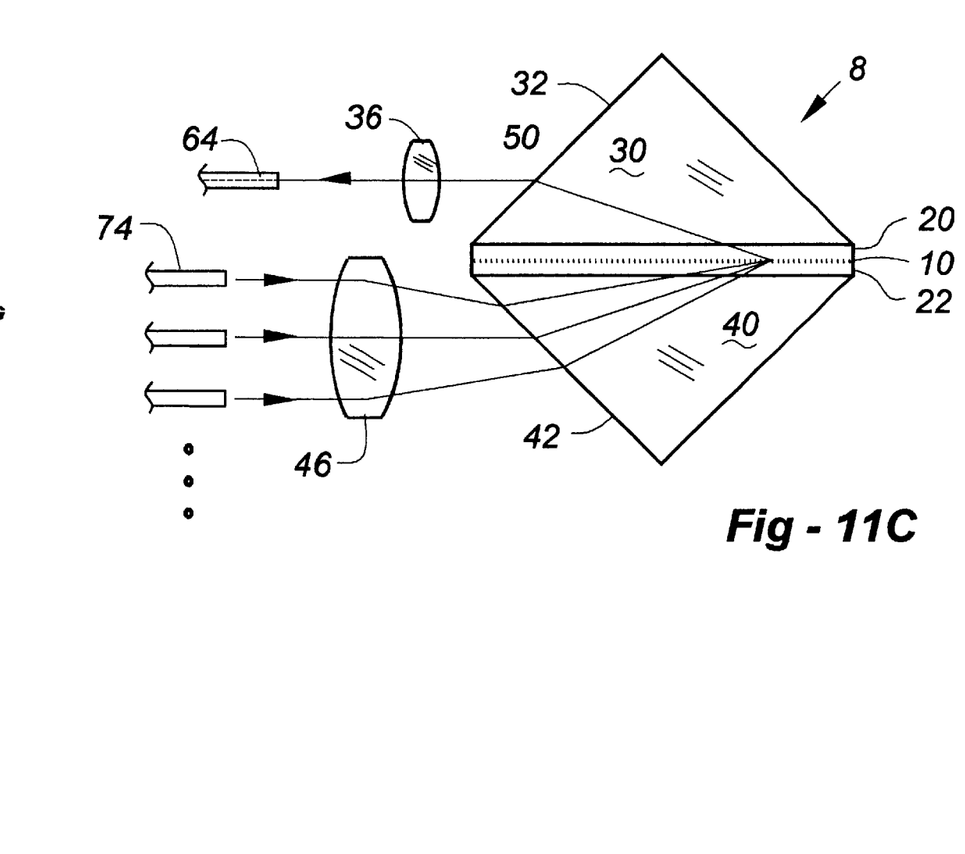

If the beam paths in FIGS. 11a and 11b are reversed, the configuration shown now in FIG. 11c can be used for multiplexing signals in different wavelength channels onto a single optical fiber. In this case, the fibers 74 would supply signals from laser transmitters, each laser operating at a different wavelength, to form the set of wavelength channels that are to be combined by the multiplexer. The multiplexed output signal would be focused by lens 36 into the main communications fiber 64.

In yet another embodiment of the present invention, a thin-film version of the optical element could be fabricated in an optical waveguide. The volume phase grating in this embodiment would take the form of a planar Bragg grating in the waveguide.

We claim:

1. A polarization-insensitive dispersive optical element which receives input light at multiple wavelengths with a polarization state at an angle of incidence, and produces dispersed output light with a diffraction efficiency at an angle of diffraction, the element comprising: a volume-phase grating having a high-frequency fringe spacing within a grating medium having a first refractive index;

a substrate having a second refractive index supporting the grating medium; and wherein the high-frequency fringe spacing facilitates large angles of incidence and diffraction, and the first and second refractive indices are different, such that the diffraction efficiency of the element is substantially constant over the multiple wavelengths regardless of the polarization state of the input light.

2. The optical element of claim 1, wherein the grating is a transmission or a reflection grating.

3. The optical element of claim 1, wherein the input wavelengths are contiguous.

4. The optical element of claim 1, wherein the input light is carried by an optical fiber.

5. The optical element of claim 1, further including a plurality of output optical fibers, each carrying light of a different band of wavelengths as subsets of the input band of wavelengths.

6. The optical element of claim 1, further including a plurality of optoelectric detectors, each receiving output light of a different band of wavelengths as subsets of the input band of wavelengths.

7. The optical element of claim 1, wherein the angle of incidence is greater than 60 degrees.

8. The optical element of claim 1, wherein the substrate is an optical prism.

9. The optical element of claim 8, wherein the grating is supported between opposing optical prisms.

10. The optical element of claim 1, wherein average index of the grating medium is somewhat lower than the support substrate.

11. The optical element of claim 1, wherein the grating is holographically derived.

12. A polarization insensitive optical element, comprising:

a volume-phase grating having an index of refraction adjacent a supporting substrate having an index of refraction which is different from that of the grating, the grating/substrate combination being operative to:

a) receive a beam of light at an angle of incidence and disperse the beam into multiple output wavelengths at an angle of diffraction, thereby functioning as an optical demultiplexer, or b) receive multiple input wavelengths at an angle of incidence and combine them into a single output beam at an angle of diffraction, thereby functioning as an optical multiplexer; and wherein the light in each case includes a combination of s and p polarization states, and difference in the indexes of refractive indices and the angles of incidence and diffraction are such that the diffraction efficiency of the element is substantially constant over multiple wavelengths regardless of the s and p polarization state.

13. The optical element of claim 12, wherein the grating is a transmission or reflection grating.

14. The optical element of claim 12, wherein the multiple wavelengths are contiguous.

15. The optical element of claim 12, wherein one or more optical fibers are used to carry the single beam or the multiple wavelengths.

16. The optical element of claim 12, further including a plurality of optoelectric detectors, each receiving one of the different wavelengths.

17. The optical element of claim 12, wherein the angle of incidence is greater than 60 degrees.

18. The optical element of claim 12, wherein the grating is supported between optical prisms.

19. The optical element of claim 12, wherein the grating is supported between prisms causing the angle formed by the single beam or multiple wavelengths to be greater than 60 degrees as measured from a line normal to the surface of the grating.

20. The optical element of claim 1, wherein the grating is supported between opposing optical substrates with said substrates of equivalent index of refraction.

21. The optical element of claim 1, wherein the grating is supported between opposing optical substrates with said substrates of different index of refraction with respect to each other.

* * * * *